(12) United States Patent
Taniguchi

(10) Patent No.: US 10,850,257 B2
(45) Date of Patent: Dec. 1, 2020

(54) DIATOMACEOUS EARTH PRODUCT AND METHOD FOR MAKING PRODUCT

(71) Applicant: Imerys Filtration Minerals, Inc., San Jose, CA (US)

(72) Inventor: Jeffrey D. Taniguchi, Santa Maria, CA (US)

(73) Assignee: IMERYS USA, INC., Roswell, GA (US)

(*) Notice: Subject to any disclaimer, the term of this patent is extended or adjusted under 35 U.S.C. 154(b) by 0 days.

(21) Appl. No.: 15/103,361

(22) PCT Filed: Dec. 1, 2014

(86) PCT No.: PCT/US2014/067873
§ 371 (c)(1),
(2) Date: Jun. 10, 2016

(87) PCT Pub. No.: WO2015/088800
PCT Pub. Date: Jun. 18, 2015

(65) Prior Publication Data
US 2016/0332135 A1 Nov. 17, 2016

Related U.S. Application Data

(60) Provisional application No. 61/914,196, filed on Dec. 10, 2013.

(51) Int. Cl.
*B01J 20/14* (2006.01)
*B01D 39/06* (2006.01)
*B01J 20/28* (2006.01)

(52) U.S. Cl.
CPC ............. *B01J 20/14* (2013.01); *B01D 39/06* (2013.01); *B01J 20/28011* (2013.01); *B01J 20/28059* (2013.01); *B01D 2239/1291* (2013.01)

(58) Field of Classification Search
CPC B01J 20/14; B01J 20/28011; B01J 20/28059; B01D 39/06; B01D 2239/1291
See application file for complete search history.

(56) References Cited

U.S. PATENT DOCUMENTS

2001/0023233 A1† 9/2001 Shiuh
2004/0245124 A1† 12/2004 Hurst

FOREIGN PATENT DOCUMENTS

WO  WO 2010/042614 A1   4/2010
WO     2013014450    †   1/2013
WO  WO 2013/014450 A1   1/2013

OTHER PUBLICATIONS

International Search Report and Written Opinion dated Apr. 14, 2015, in International Application No. PCT/US2014/067873 (17 pgs.).
VULCASCOT. Celite® Standard SuperCel mex. 2011. [retrieved on Mar. 30, 2015]. Retrieved from the internet, <URL: http://www.vulcascot.at/media/content/downloads/eigenmarken_kieselgur.pdf>. entire document.
VULCASCOT. Celite® Hyflo SuperCel mex. 2011. [retrieved on Mar. 30, 2015].
Retrieved from the internet. <URL: http://www.vulcascot.at/media/content/downloads/eigenmarken_kieselgur.pdf>. entire document.
VULCASCOT. Celite® Hyflo SuperCel Murat. 2011. [retrieved on Mar. 30, 2015]. Retrieved from the Internet. <URL: http://www.vulcascot.at/media/content/downloads/eigenmarken_kieselgur.pdf>. entire document.
IMERYS Performance & Filtration Minerals. CELITE™ FilterCel M. 2009. [retrieved on Mar. 30, 2015]. Retrieved from the Internet. <URL: http://www.murphyandson.co.uk/datasheets/Data-Sheets2/Celite%20Filter%2020Cel%20M.pdf>. entire document.
Supplementary European Search Report dated Jun. 29, 2017, in EP Application No. 14870575.9 which corresponds to PCT/US2014/067873 (12 pgs.).
Imerys Diatomite México: "Celite STM", Technical Data Sheet, Jan. 9, 2012, Retrieved from the Internet: URL:http://www.imerys-filtration.com/ , [retrieved on Jan. 31, 2017] 1 page.
Advanced Minerals Corporation; "Comparing Conventional Diatomite and Celpure R Filter Aids", Technical Note AMC02 Version 3.5, Sep. 2002, 2 pages.
Celite Corporation: "Celite 499" Technical Data Sheet, Jul. 1, 2005, Retrieved from the Internet: URL:http://www.imerys-perfmins.com/eu/ProductDetail.asp?PID=436 [retrieved on Feb. 2, 2017], 1 page.
FL Kadey, Diatomite in Industrial Minerals and Rocks, 5th Edition, 6 pages, 1983, Society of Mining Engineers, New York.†
Celite Standard SuperCel mex, 1 page, May 2011, http://www.vulcascot.at/media/content/downloads/eigenmarken_kieselgur.pdf.†
Celite Hyflo SuperCel Murat, 1 page, May 2011, http://www.vulcascot.at/media/content/downloads/eigenmarken_kieselgur.pdf.†

(Continued)

*Primary Examiner* — James A Fiorito
(74) *Attorney, Agent, or Firm* — Finnegan, Henderson, Farabow, Garrett & Dunner

(57) ABSTRACT

A diatomaceous earth product may include diatomaceous earth having a loose weight density of less than about 14 lbs/ft³, and a stoichiometric ratio of alkali metal to iron and/or aluminum ranging from about 100% to about 400%. A diatomaceous earth product may include diatomaceous earth having a loose weight density of less than about 14 lbs/ft³, and a silica specific volume of at least about 3.2. A method for making a low loose weight density diatomaceous earth product may include providing a feed material comprising diatomaceous earth having a silica specific volume of at least about 3.5. The method may further include adding alkali flux to the feed material to achieve a combination having a stoichiometric ratio of alkali metal to iron and/or aluminum that ranges from about 100% to about 400%, calcining the combination at a temperature ranging from about 1,600° F. to about 2,200° F.

17 Claims, No Drawings

(56) References Cited

OTHER PUBLICATIONS

Celite Standard SuperCel Murat, 1 page, May 2011, http://www.vulcascot.at/media/content/downloads/eigenmarken_kieselgur.pdf.†
Celite Hyflo SuperCel Mex, 1 page, May 2011 http://www.vulcascot.at/media/content/downloads/eigenmarken_kieselgur.pdf.†
Celite FilterCel E Murat, 1 page, May 2011, http://www.vulcascot.at/media/content/downloads/eigenmarken_kieselgur.pdf.†
Super Floss Technical Data Sheet, 1 page, retrieved in 2008 from website http://strauchchemical.com.†
Celite 379 Technical Data Sheet, 1 page, retrieved in 2008 from website http://strauchchemical.com.†
Celite 281 Technical Data Sheet, 1 page, retrieved in 2008 from website http://strauchchemical.com.†
Celite 392 Technical Data Sheet, 1 page, 2008, retrieved in 2008 from website http://strauchchemical.com.†
Celite 499 Technical Date Sheet, 1 page, retrieved in 2008 from website http://strauchchemical.com.†
Celite Standard Super-Cel, Jul. 11, 2012, 1 page, URL:http://xcoenologie.ch/up/upload/TDS%20Standard%20Super%20Cel%20L%20(3).pdf.†
Wang et al, Bioinspired Porous Hybrid Materials via Layer-by-Layer Assembly in Bio-inorganic Hybrid Nanomaterials: Strategies, Synthesis, Characterization, 4 pages, 2008, Wiley-VCH Germany.†
Chromosorb, 5 pages, 2003, retrieved Mar. 15, 2017 from http://web.archive.org/web/20051221082902/http://www.advancedminerals.com/pdf/Chromosorb_diatomite_supports.pdf.†
Comparing Conventional Diatomite and Celpure Filter Aids, 2 pages, 2002, http://www.advancedminerals.com/pdf/amc02_compare_conv._f._aid_celpure.pdf.†
Sulpizio, Adv in Filter Aid and Precoat Filtration Tech, 16 pages, 1999 at the American Filtration & Separations Soc Tech Conf, Boston. http://www.advancedminerals.com/pdf/amc07_adv._in%20filter_aid_precoat_tech.pdf.†
High Purity Filter Media, 5 pages, 2002, retrieved from URL: https://web.archive.org/web/20030211085933/http://www.advancedminerals.com/high_purity_filtration.htm.†

† cited by third party

DIATOMACEOUS EARTH PRODUCT AND METHOD FOR MAKING PRODUCT

CLAIM FOR PRIORITY

This application is a U.S. national phase entry under 35 U.S.C. § 371 from PCT International Application No. PCT/US2014/067873, filed Dec. 1, 2014, which claims the benefit of priority of U.S. Provisional Patent Application No. 61/914,196, filed Dec. 10, 2013, to both of which this application claims the benefit of priority, and the entirety of the subject matter of both of which is incorporated herein by reference.

DESCRIPTION

Field of the Disclosure

This disclosure relates to a biogenic silica product obtained from diatomaceous earth and methods for preparing biogenic silica products. More particularly, this disclosure relates to a biogenic silica product, which may bear the distinguishing porous and intricate structure of silica unique to diatomaceous earth and which may have a high silica content (i.e., silicon dioxide, $SiO_2$) and/or low loose weight density, resulting in a high silica specific volume (SSV). The present disclosure also relates to modified, purified biogenic silica products that may have exceptionally low content of soluble metals and/or extreme brightness.

Background

The present disclosure relates to diatomaceous earth products, which may both retain the intricate and porous structure unique to diatomaceous earth (i.e., which have an intricate and porous diatomaceous silica structure), and/or may have a unique combination of desirable physical and chemical properties (such as, for example, high purity, low density, low soluble impurity content, low total impurity content, and/or high brightness).

Diatomaceous earth products may be used in a wide variety of applications, including, but not limited to, separation, adsorption, support, and functional filler applications. At least some products according to the present disclosure may exhibit the intricate and porous structure unique to diatomite silica and/or exceptional purity, and may permit greatly increased effectiveness in many of these applications. Diatomaceous earth products may be obtained from diatomaceous earth (also known as "kieselguhr"), which is a sediment enriched in biogenic silica (i.e., silica produced or brought about by living organisms) in the form of the siliceous frustules (i.e., shells or skeletons) of diatoms. Diatoms include a diverse array of microscopic, single-celled, golden brown algae of the class Bacillariophyceae, which possess an ornate siliceous skeleton (i.e., a frustule) of varied and intricate structure including two valves which, in the living diatom, fit together much like parts of a pill box. The morphology of the frustules varies widely among species and serves as the basis for taxonomic classification; over 2,000 distinct species are known. The surface of each valve is characterized by a series of openings that include the complex fine structure of the frustule and impart a design that is distinctive to individual species. The size of typical frustules ranges from 0.75 to 1,000 micrometers (microns), although the majority are in the range of 10 to 150 microns. These frustules are sufficiently durable to retain much of their porous and intricate structure virtually intact through long periods of geologic time when preserved in certain conditions (e.g., conditions that maintain chemical equilibrium).

The fundamental chemical composition and the intricate and porous structure of the diatom frustule may provide diatomaceous earth with unique commercial value and versatility unmatched by other natural forms of silica in certain applications; for example, filtration and filler applications. The fine particulate structure of the diatom skeleton imparts low density and high surface area, as well as high porosity and permeability. Diatomaceous earth products may be processed or manufactured by a variety of methods and from numerous resources, offering diversity in both physical and chemical characteristics.

For example, in the field of filtration, methods of particle separation from fluids may employ diatomaceous earth products as filter aids. The intricate and porous structure unique to diatomite silica may be particularly effective for the physical entrapment of particles in filtration processes. For example, diatomaceous earth products may be used to improve the clarity of fluids that contain suspended particles or particulate matter, or that have turbidity.

Diatomaceous earth products may be applied to a septum to improve clarity and increase flow rate in filtration processes, for example, in a step sometimes referred to as "precoating." Diatomaceous earth products may often be added directly to a fluid as it is being filtered to reduce the loading of undesirable particulate at the septum while maintaining a designed liquid flow rate, in a step often referred to as "body feeding." Depending on the particular separation involved, diatomaceous earth products may be used in precoating and/or body feeding.

In some filtration applications, different diatomaceous earth products may be blended together to further modify or improve the filtration process. Also, diatomaceous earth products may sometimes be combined with other substances. In some cases, these combinations may involve simple mixtures, for example, with cellulose, activated charcoal, clay, or other materials. In other cases, these combinations are composites in which diatomite products may be intimately compounded with other ingredients to make sheets, pads, or cartridges. Still more elaborate modifications of any of some diatomaceous earth products may be used for filtration or separation, involving, for example, surface treatment and the addition of chemicals to diatomaceous earth products, mixtures, or their composites.

In certain circumstances, diatomaceous earth products may also exhibit unique adsorptive properties during filtration that may greatly enhance clarification or purification of a fluid. These adsorptive properties may be highly specific, and may depend on either weak forces for attraction of the adsorbed species to weak electrical charges at the surface of diatomaceous earth, or on the reactivity of silanol (i.e., $\equiv Si-OH$) functional groups that often occur at the diatomite surface. For example, an ionized silanol group (i.e., $\equiv Si-OH$) may react with a hydronium ion (i.e., $H_3O^+$) contributed by an acidic substance in solution, for example, citric acid (i.e., $C_6H_8O_7$), adsorbing the donated $H^+$ at the surface in the process.

The intricate and porous structure of silica unique to diatomaceous earth products may also permit their commercial use to provide anti-block properties to polymers. Diatomaceous earth products may often be used to alter the appearance or properties of paints, enamels, lacquers, and related coatings and finishes. In addition to their use in paper or cellulose-bearing filter media, diatomaceous earth products may be used commercially in paper processing applications, and they may be essential to the processing of certain commercial catalysts. Diatomaceous earth products may also be used as chromatographic supports, and may be particularly suited to, for example, gas-liquid chromatographic methods.

Regardless of the manner in which diatomaceous earth products are used in separating particles from fluids, the diatomaceous earth product makes contact with the fluid from which particles are being removed. As ingredients in polymers, plastics, paints, coatings, and/or other formulations, diatomaceous earth products may also come into contact with most of the other ingredients in the formulation. For this reason, high silica purity and low solubility of impurities in the diatomaceous earth product may be highly desirable properties. In addition, the efficiency and usefulness of a diatomaceous earth product used as a filter aid may also be related to its density when in contact with fluid during filtration operations. In some instances, a diatomaceous earth product having a low density is highly desirable.

Highly purified diatomaceous earth products may be desirable for numerous applications. As the effectiveness of diatomite in its applications may generally be related to the presence of the porous and intricate structure of silica unique to diatomite in combination with high silica purity, purified/processed diatomaceous earth products may offer distinguishing characteristics.

SUMMARY

In accordance with a first aspect, a diatomaceous earth product may include diatomaceous earth having a loose weight density of less than about 14 pounds per cubic foot (lbs/ft$^3$), and a stoichiometric ratio of alkali metal to iron and/or aluminum ranging from about 100% to about 400%. For example, the loose weight density may range from about 6 lbs/ft$^3$ to about 10 lbs/ft$^3$, or from about 11 lbs/ft$^3$ to about 14 lbs/ft$^3$. According to a further aspect the stoichiometric ratio of alkali metal to iron and/or aluminum may range from about 125% to about 350%, from about 150% to about 300%, from about 150% to about 250%, from about 175% to about 325%, from about 175% to about 300%, or from about 175% to about 275%.

According to yet another aspect, the diatomaceous earth product may have a BET surface area ranging from about 0.5 square meter per gram (m$^2$/g) to about 20 m$^2$/g, from about 1 m$^2$/g to about 20 m$^2$/g, from about 1 m$^2$/g to about 10 m$^2$/g, from about 2 m$^2$/g to about 10 m$^2$/g, from about 1 m$^2$/g to about 5 m$^2$/g, or from about 3 m$^2$/g to about 5 m$^2$/g.

According to another aspect, particles of the diatomaceous earth product may have a size ranging from about 20 US Mesh sieve to about 270 US Mesh sieve. For example, particles of the diatomaceous earth product may have a size ranging from about 20 US Mesh sieve to about 200 US Mesh sieve, from about 60 US Mesh sieve to about 140 US Mesh sieve, or from about 80 US Mesh sieve to about 120 US Mesh sieve. According to a further aspect, particles of the diatomaceous earth product may have a much narrower size range for greater utility in any application. For example, particles of the diatomaceous earth product may have a size ranging from about 80 US Mesh sieve to about 100 US Mesh sieve.

According to a further aspect, the diatomaceous earth product may have a silica content of at least about 95% by weight. According to another aspect, the diatomaceous earth product may be one of non-calcined and non-flux-calcined, and may have a silica content of at least about 95% by weight. According to a further aspect, the diatomaceous earth product may have a silica content of at least about 90% by weight. According to another aspect, the diatomaceous earth product may be flux-calcined, and may have a silica content of at least about 90% by weight.

According to another aspect, the diatomaceous earth product may have a silica specific volume of at least about 3.2, at least about 3.5, at least about 3.7, or at least about 4.

According to still another aspect, the diatomaceous earth product may have a content of at least 70% by weight, within two narrowly specified US Mesh sieve sizes. According to a further aspect, the diatomaceous earth product may have a content of at least 80% by weight, within two narrowly specified US Mesh sieve sizes. According to still a further aspect, the diatomaceous earth product may have a content of at least 90% by weight, within two narrowly specified US Mesh sieve sizes. For example, the diatomaceous earth product may have a content of at least 80% by weight, within 80 US Mesh (177 microns) and 100 US Mesh (149 microns) sieve sizes, or the diatomaceous earth product may have a content of at least 90% by weight, within 60 US Mesh (250 microns) and 80 US Mesh (177 microns) sieve sizes.

According to a further aspect, the diatomaceous earth product may have an iron solubility ranging from about 0.5 parts per million to about 15 parts per million. According to yet another aspect, the diatomaceous earth product may have a wet density less than about 16 lbs/ft$^3$.

According to another aspect, the diatomaceous earth product may have an intricate and porous diatomaceous silica structure.

According to still another aspect, a diatomaceous earth product may include a diatomaceous earth having a loose weight density of less than about 14 lbs/ft$^3$, and a silica specific volume of at least about 3.2, at least about 3.5, at least about 3.7, or at least about 4. According to another aspect, the loose weight density may range from about 6 lbs/ft$^3$ to about 10 lbs/ft$^3$, or from about 11 lbs/ft$^3$ to about 14 lbs/ft$^3$.

According to still a further aspect, the diatomaceous earth product may have a stoichiometric ratio of alkali metal to iron and/or aluminum ranging from about 125% to about 350%. For example, the stoichiometric ratio of alkali metal to iron and/or aluminum may range from about 150% to about 300%, from about 150% to about 250%, from about 175% to about 325%, from about 175% to about 300%, or from about 175% to about 275%.

According to yet another aspect, the diatomaceous earth product may have a BET surface area ranging from about 0.5 m$^2$/g to about 20 m$^2$/g. For example, the diatomaceous earth product may have a BET surface area ranging from about 1 m$^2$/g to about 20 m$^2$/g, from about 1 m$^2$/g to about 10 m$^2$/g, from about 2 m$^2$/g to about 10 m$^2$/g, from about 1 m$^2$/g to about 5 m$^2$/g, or from about 3 m$^2$/g to about 5 m$^2$/g.

According to yet another aspect, particles of the diatomaceous earth product may have a size ranging from about 20 US Mesh sieve to about 270 US Mesh sieve. For example, the particles of diatomaceous earth product may have a size ranging from about 20 US Mesh sieve to about 200 US Mesh sieve, from about 60 US Mesh sieve to about 140 US Mesh sieve, or from about 80 US Mesh sieve to about 120 US Mesh sieve.

According to a further aspect, the diatomaceous earth product may have a silica content of at least about 95% by weight. According to another aspect, the diatomaceous earth product may be one of non-calcined and non-flux-calcined, and may have a silica content of at least about 95% by weight. According to a further aspect, the diatomaceous earth product may have a silica content of at least about 90% by weight. According to another aspect, the diatomaceous earth product may be flux-calcined, and may have a silica content of at least about 90% by weight.

According to still a further aspect, a method for making a low loose weight density diatomaceous earth product may include providing a feed material including diatomaceous earth having a silica specific volume of at least about 3.2, at least about 3.5, at least about 3.7, or at least about 4. The method may further include adding alkali flux to the feed material to achieve a combination having a stoichiometric ratio of alkali metal to iron and/or aluminum ranging from about 100% to about 400%. The method may also include calcining the combination at a temperature ranging from about 1,600° F. to about 2,200° F., wherein following calcination, the diatomaceous earth product has a loose weight density of less than about 14 lbs/ft$^3$. For example, the temperature may range from about 1,600° F. to about 2,150° F., or from about 1,600° F. to about 2,050° F.

According to a further aspect, the calcining may occur for a duration ranging from about 15 minutes to about 60 minutes. For example, the calcining may occur for a duration ranging from about 35 minutes to about 45 minutes.

According to still another aspect, the alkali flux may be selected from the group consisting of sodium, potassium, and alkali or alkaline earth metals.

According to another aspect, the loose weight density may range from about 6 lbs/ft$^3$ to about 10 lbs/ft$^3$. According to a further aspect, the loose weight density may range from about 11 lbs/ft$^3$ to about 14 lbs/ft$^3$.

According to yet another aspect, the method may result in the stoichiometric ratio of alkali metal to iron and/or aluminum may range from about 125% to about 350%. For example, the stoichiometric ratio of alkali metal to iron and/or aluminum may range from about 150% to about 300%, from about 150% to about 250%, from about 175% to about 325%, from about 175% to about 300%, or from about 175% to about 275%.

According to yet a further aspect, the method may result in the diatomaceous earth product having a BET surface area ranging from about 0.5 m$^2$/g to about 20 m$^2$/g. For example, the diatomaceous earth product may have a BET surface area ranging from about 1 m$^2$/g to about 20 m$^2$/g, from about 1 m$^2$/g to about 10 m$^2$/g, from about 2 m$^2$/g to about 10 m$^2$/g, from about 1 m$^2$/g to about 5 m$^2$/g, or from about 3 m$^2$/g to about 5 m$^2$/g.

According to another aspect, the method may result in particles of the diatomaceous earth product having a size ranging from about 20 US Mesh sieve to about 270 US Mesh sieve. For example, the method may result in particles of diatomaceous earth product having a size ranging from about 20 US Mesh sieve to about 200 US Mesh sieve, from about 60 US Mesh sieve to about 140 US Mesh sieve, or from about 80 US Mesh sieve to about 120 US Mesh sieve.

According to yet another aspect, the method may result in the diatomaceous earth product having a silica content of at least about 95% by weight. According to another aspect, the diatomaceous earth product may be one of non-calcined and non-flux-calcined, and may have a silica content of at least about 95% by weight. According to a further aspect, the diatomaceous earth product may have a silica content of at least about 90% by weight. According to another aspect, the diatomaceous earth may be flux-calcined, and may have a silica content of at least about 90% by weight.

According to a further aspect, the method may result in the diatomaceous earth product having a silica specific volume of at least about 3.2. For example, the diatomaceous earth product may have a silica specific volume of at least about 3.5, at least about 3.7, or at least about 4.

According to another aspect, the method may result in the diatomaceous earth product having a content of at least 70% by weight, within two narrowly specified US Mesh sieve sizes. According to a further aspect, the method may result in the diatomaceous earth product having a content of at least 80% by weight, within two narrowly specified US Mesh sieve sizes. According to still another aspect, the method may result in the diatomaceous earth product having a content of at least 90% by weight, within two narrowly specified US Mesh sieve sizes. For example, the method may result in the diatomaceous earth product having a content of at least 80% by weight, within 80 US Mesh (177 microns) and 100 US Mesh (149 microns) sieve sizes, or the method may result in the diatomaceous earth product having a content of at least 90% by weight, within 60 US Mesh (250 microns) and 80 US Mesh (177 microns) sieve sizes.

According to a further aspect, the method may result in the diatomaceous earth product having an iron solubility ranging from about 0.5 parts per million to about 15 parts per million. According to yet another aspect, the method may result in the diatomaceous earth product having a wet density less than about 17 lbs/ft$^3$. According to a further aspect, the method may result in the diatomaceous earth product having a wet density less than about 16 lbs/ft$^3$. According to still another aspect, the method may result in the diatomaceous earth product having a wet density less than about 15 lbs/ft$^3$.

According to a further aspect, the feed material may include diatomaceous earth having a silica specific volume of at least about 3.5, or at least about 3.7. According to another aspect, the feed material may include diatomaceous earth having a total silica content or more than about 95% (w/w) SiO$_2$ on an ignited basis (e.g., in the range of about 95% to about 99.9% (w/w) SiO$_2$). According to some aspects, the feed material may have a centrifuged wet density of less than about 0.28 g/cm$^3$ (e.g., in the range of about 0.15 g/cm$^3$ to about 0.28 g/cm$^3$). According to some aspects, the feed material may retain the intricate and porous structure unique to diatomite, and may have a permeability that is typically less than 0.1 Darcy (e.g., in the range of about 0.001 Darcy to about 0.1 Darcy). According to some aspects, the feed material may have a total iron content of less than 0.3% (w/w) Fe$_2$O$_3$ on an ignited basis (e.g., in the range of about 0.005% to about 0.3% (w/w) Fe$_2$O$_3$), and a total aluminum content of less than 0.5% (w/w) Al$_2$O$_3$ on an ignited basis (e.g., in the range of about 0.01% to about 0.5% (w/w) Al$_2$O$_3$). With respect to solubility, according to some aspects, the feed material may have a specific resistance greater than 50 kQ-cm (e.g., in the range of about 50 kQ-cm to about 250 kQ-cm), a beer-soluble iron content less than 7 mg Fe/kg feed (e.g., in the range of from about the quantitation limit to about 7 mg Fe/kg feed), and a beer-soluble aluminum content less than 10 mg Al/kg feed (e.g., in the range of from about the quantitation limit to about 10 mg Al/kg feed).

According to yet another aspect, the method may result in the diatomaceous earth product having an intricate and porous diatomaceous silica structure.

It is to be understood that both the foregoing general description and the following detailed description are exemplary and explanatory only and are not restrictive of the invention, as claimed.

DESCRIPTION OF EXEMPLARY EMBODIMENTS

Reference will now be made in detail to exemplary embodiments.

According to some embodiments, a diatomaceous earth product may include diatomaceous earth having a loose weight density of less than about 14 lbs/ft$^3$, and a stoichiometric ratio of alkali metal to iron and/or aluminum ranging from about 100% to about 400%. For example, the loose weight density may range from about 6 lbs/ft$^3$ to about 10 lbs/ft$^3$, or from about 11 lbs/ft$^3$ to about 14 lbs/ft$^3$. According to a further aspect the stoichiometric ratio of alkali metal to iron and/or aluminum may range from about 125% to about 350%, from about 150% to about 300%, from about 150% to about 250%, from about 175% to about 325%, from about 175% to about 300%, or from about 175% to about 275%.

One method for measuring loose weight density includes measuring the weight of a sample powder and the volume occupied by the sample powder, and dividing the former by the latter. For example, a scale (e.g., a Mettler Digital Scale or equivalent) may be zeroed with respect to an empty calibrated container having a known volume (e.g., 625 cubic centimeters (cc or cm$^3$)). The sample powder is sifted through a screen to break up any lumps and fluff the powder. The sifted powder is thereafter lifted with a scoop, and the powder is shaken into the calibrated container with a rotary sifting motion until the container is overflowing with the sifted powder. Excess powder is scraped off with a straight edge spatula. Thereafter, the powder-filled container is weighed, for example, to the nearest tenth of a gram. The loose weight density is determined using the following formula:

Loose weight density (lbs/ft$^3$)=Net weight (lbs)/volume (ft$^3$).

According to some embodiments, the diatomaceous earth product may have a BET surface area ranging from about 0.5 m$^2$/g to about 20 m$^2$/g, from about 1 m$^2$/g to about 20 m$^2$/g, from about 1 m$^2$/g to about 10 m$^2$/g, from about 2 m$^2$/g to about 10 m$^2$/g, from about 1 m$^2$/g to about 5 m$^2$/g, or from about 3 m$^2$/g to about 5 m$^2$/g.

One technique for calculating specific surface area (or BET surface area) of physical adsorption molecules is with the Brunauer, Emmett, and Teller ("BET") theory. The application of BET theory to a particular adsorbent component yields a measure of the material's specific surface area, known as "BET surface area." As used herein, "surface area" refers to BET surface area.

According to some embodiments, particles of the diatomaceous earth product may have a size ranging from about 20 US Mesh sieve to about 200 US Mesh sieve. For example, particles of the diatomaceous earth product may have a size ranging from about 60 US Mesh sieve to about 140 US Mesh sieve, or from about 80 US Mesh sieve to about 120 US Mesh sieve.

According to some embodiments, the diatomaceous earth product may have a silica content of at least about 95% by weight. According to some embodiments, the diatomaceous earth product may be one of non-calcined and non-flux-calcined, and may have a silica content of at least about 95% by weight. According to some embodiments, the diatomaceous earth product may have a silica content of at least about 90% by weight. According to some embodiments, the diatomaceous earth product may be flux-calcined, and may have a silica content of at least about 90% by weight.

For some embodiments, the diatomaceous earth products may conveniently be described as "non-calcined," "calcined," or "flux-calcined," depending on how the product is prepared. These broad classes reflect the method of preparation employed, which may determine the permeability of the product, for example, by moderating the degree to which agglomeration and sintering occurs, which may be of general importance to the useful application of the diatomaceous earth products.

As used herein, the term "non-calcined" with respect to a product refers to a product that has not been subjected to calcination or flux-calcination. As used herein, the term "calcined" with respect to a product refers to a product that has been subjected to calcination. As used herein, the term "flux-calcined" with respect to a product refers to a product that has been subjected to flux-calcination (i.e., calcination in the presence of a flux).

While the silica of diatomaceous earth is predominantly of an amorphous type that resembles mineral opal, crystalline quartz dust or sand is sometimes present which, although composed of silica, does not emulate the intricate and porous structure associated with diatomaceous earth or diatomite products. Upon calcination or flux-calcination, products may be formed in which diatomaceous earth particles are sintered to one another into larger agglomerated masses, thus modifying some of the properties of the diatomite products. Even after intense calcining, some diatomite products retain much of their intricate and porous structure, although conversion of amorphous hydrated silica to amorphous anhydrous silica, cryptocrystalline cristobalite, and/or cryptocrystalline quartz may result from such processing.

Accurate measurements of total silica content may be determined by using x-ray fluorescence spectrometry. This example technique may also be useful to determine the total content of other elements, such as, for example, aluminum, iron, and sodium.

For example, in a "fused tetraborate matrix" x-ray fluorescence method used to determine the total element contents of embodiments of the diatomaceous earth products, a 2 gram diatomite sample (after roasting at 950° C. in air for one hour), is fused with 7.7 grams of lithium tetraborate (i.e., Li$_2$B$_4$O$_7$), and the melt is cast into a 40 millimeter button. The button is analyzed on a Philips PW1600 simultaneous x-ray fluorescence spectrometer. This system may be calibrated using reference materials, most of which are tabulated. Counting time on major elements, such as, for example, silicon, aluminum, iron, or sodium, is 60 seconds, and each element is determined through its own fixed channel. Loss on ignition data are obtained from the roasting. To accommodate the natural loss of hydration within the silica structure, the total silicon, aluminum, iron, and sodium contents for all examples are reported on an ignited basis for their respective high oxides (i.e., SiO$_2$, Al$_2$O$_3$, Fe$_2$O$_3$, and Na$_2$O). As used herein, the term "on an ignited basis" reflects the pre-treatment of the sample by roasting at 950° C. in air for one hour prior to analysis.

In an alternative "pressed binder matrix" x-ray fluorescence method for determining total element content, a 3 gram diatomite sample (after roasting at 950° C. in air for one hour) is added to 0.75 gram of SPECTROBLEND® (Chemplex) binder. The mixture is milled by shaking for 5 minutes in a tungsten carbide mixing vial with an impact ball. The resulting mixture is then pressed in a 31 millimeter die to 24,000 pounds per square inch (165 MPa) to form a pellet. Chemical composition may thereafter be determined using a Spectrace 6000 energy-dispersive x-ray fluorescence spectrometer operating under fundamental parameters, with calibration using six diatomite standards prepared in the same manner as the samples being tested. The instrument employs an electronically-cooled Li(Si) detector and 50 kV rhodium target x-ray source, and is configured to result in sample excitation with approximately 50% deadtime. Peak intensities from spectra are analyzed by lineshape analysis comparison with single element reference spectra. Specifically, the $K_{alpha}$ peak intensities used for silicon, aluminum, and iron determinations correspond with energies of 1.740 keV, 1.487 keV, and 6.403 keV, respectively. The peak intensities for the diatomite standards are thereafter converted into pure element count rates, which are used for determining element contents in samples, by peak intensity and data fitting. This method achieves results that are comparable to the aforementioned method for all elements except sodium, for which the relative error is significantly greater than for the fused tetraborate matrix method.

According to some embodiments, the diatomaceous earth product may have a silica specific volume of at least about 3.2. For example, the diatomaceous earth product may have a silica specific volume of at least about 3.5, at least about 3.7, or at least about 4.

Under some circumstances, it may be desirable for a diatomite product to have both a high total silica content and a low centrifuged wet density. This combination of properties may provide a measure of the usefulness of the product as compared to diatomite products of lesser purity. Impure diatomite is expected to have greater centrifuged wet density owing to the occupation of its porous, intricate structure with the impure substances. One measure to quantify this combination of properties, the specific volume occupied by silica, may be defined as:

$$\text{Silica Specific Volume (SSV)} = \text{Fraction Silica Content}/\text{Centrifuged Wet Density},$$

where the fraction silica content is calculated by dividing the percent by weight of $SiO_2$ on an ignited basis by 100, and the centrifuged wet density is expressed in units of grams per cubic centimeter ($g/cm^3$). For example, for a sample with a measured total silica content of 99.1% (w/w) $SiO_2$ and a centrifuged wet density of 0.27 $g/cm^3$, a silica specific volume (SSV) of 0.991/0.27, equal to about 3.7, is obtained. As is readily apparent from the equation, the greater the silica specific volume, the greater the diatomite purity of the product.

The influence of both the content of total silica and wet density may be accounted for in this expression, silica specific volume (SSV). Even small changes in the total silica content or the centrifuged wet density result in significant changes of the silica specific volume, and the silica specific volume therefore may provide a highly discriminating measure of diatomite product purity.

According to some embodiments, the diatomaceous earth product may have a content of at least 70% by weight, within two narrowly specified US Mesh sieve sizes. According to some embodiments, the diatomaceous earth product may have a content of at least 80% by weight, within two narrowly specified US Mesh sieve sizes. According to some embodiments, the diatomaceous earth product may have a content of at least 90% by weight, within two narrowly specified US Mesh sieve sizes. For example, the diatomaceous earth product may have a content of at least 80% by weight, within 80 US Mesh (177 microns) and 100 US Mesh (149 microns) sieve sizes. According to some embodiments, the diatomaceous earth product may have a content of at least 90% by weight, within 60 US Mesh (250 microns) and 80 US Mesh (177 microns) sieve sizes.

An example method for determining the minimum weight percent passing or retained on a specific sieve opening on an Alpine tester follows: A. Select the appropriate two sieves for material to be tested; B. Weigh out a 10 gram sample on scale; C. Pour the sample on the smaller opening sieve, place it on an Alpine tester, and cover it with the Lucite lid; D. Adjust vacuum to ½" above the neutral level (the water level when the vacuum is off) on the graduated scale of the water manometer ("U" shaped tube); E. Set timer for 2 minutes; F. Remove sieve after 2 minutes, brush sample from screen (smaller openings) into cup, weigh, and note this as weight "A" for Step 1 that follows; and G. Transfer the sample onto the second sieve (larger openings), cover with Lucite lid, and follow same procedures D, E, and F above, but note this as weight "D" for Step 2 that follows. Following performance of procedures A-G, the following calculations are performed:

The percent retained on each sieve or mesh fraction is calculated:

Step 1: From smaller sieve:

$$(10.0 - A) \times 10 = B$$

Where: A=weight of residue
B=% of undersized material

Step 2: From larger sieve:

$$D \times 10 = C$$

Where: D=weight of residue
C=% of oversized material

Step 3:

$$(100 - B\ C) = E$$

Where: B=% of undersized material
C=% of oversized material
E=% mesh fraction.

According to a further aspect, the diatomaceous earth product may have an iron solubility ranging from about 0.5 parts per million to about 15 parts per million.

An example method for determining the iron solubility follows: Weigh 5.0 g of sample into a tared 250 ml Erlenmeyer flask. Add 25 ml of 3.0N HCl. Manually swirl for 5 seconds every 5 minutes for 15 minutes. Add 50 ml DI water and swirl for 2 minutes. Filter this through a #42 Whatman filter using a Buchner funnel and vacuum flask. Pour another 50 ml DI water on the filter cake and filter to dryness. Pour some of this into a sample holder. Load the samples and run them on the Inductively Coupled Plasma (ICP) Optical Emission Spectrophotometer for analysis. This instrument compares the intensity of the specific frequency of light emitted from the Iron (Fe) in the sample to that of standard reference materials of known Iron (Fe) concentration for the determination of content in the extract. This concentration is used to calculate the soluble Iron (Fe) content in milligrams per kilogram in the original dry sample.

According to some embodiments, the diatomaceous earth products may have a blue light reflected brightness of at least about 80%.

In many instances, especially in filler applications, diatomite products have greater utility if they have a high reflected brightness. An example of a method for determining reflected brightness involves measuring the amount of blue light reflected from a smooth surface of the product, as determined using a special instrument that provides a source of illumination, a blue filter, and a detector (Photovolt Brightness Meter, Model 575). The instrument is calibrated using standard plates of known reflectance in blue light, after the lamp has been turned on, and its emission output has stabilized. If the sample to be tested is a non-calcined product, the sample should be dried to constant weight at 110° C. in air, and subsequently allowed to cool to room temperature in air (i.e., dried). If the sample to be tested is a calcined or flux-calcined product, the sample should be dried to constant weight at room temperature in air. A plastic plate having a depression machined into it is slightly overfilled with the sample, which is then compressed with a smooth-faced plate using a circular pressing motion. The smooth-faced plate is carefully removed with a sliding motion to insure an even, unmarred surface. The sample is then placed at the instrument's sample port with the blue filter in place. The reflectance measurement is then read directly from the instrument. Blue light reflectance can also be calculated from measurements of brightness obtained using other instruments, for example, those available from Hunter or CIE (Commission Internationale de l'Eclairage).

According to some embodiments, the non-calcined diatomaceous earth products have centrifuged wet densities of less than about 18 lbs/ft$^3$. For example, according to some embodiments, the non-calcined diatomaceous earth products have a wet density ranging from about 1 lb/ft$^3$ to about 18 lbs/ft$^3$, from about 5 lbs/ft$^3$ to about 18 lbs/ft$^3$, from about 7 lbs/ft$^3$ to about 18 lbs/ft$^3$, or from about 9 lbs/ft$^3$ to about 18 lbs/ft$^3$. According to some embodiments, the calcined diatomaceous earth products have centrifuged wet densities of less than about 18 lbs/ft$^3$. For example, according to some embodiments, the calcined diatomaceous earth products have a wet density ranging from about 1 lb/ft$^3$ to about 18 lbs/ft$^3$, from about 6 lbs/ft$^3$ to about 18 lbs/ft$^3$, from about 6 lbs/ft$^3$ to about 16 lbs/ft$^3$, from about 6 lbs/ft$^3$ to about 15 lbs/ft$^3$, or from about 6 lbs/ft$^3$ to about 14 lbs/ft$^3$. According to some embodiments, the flux-calcined diatomaceous earth products have centrifuged wet densities of less than about 19 lbs/ft$^3$. For example, according to some embodiments, the flux-calcined diatomaceous earth products have a wet density ranging from about 1 lb/ft$^3$ to about 19 lbs/ft$^3$, from about 6 lbs/ft$^3$ to about 19 lbs/ft$^3$, from about 6 lbs/ft$^3$ to about 16 lbs/ft$^3$, from about 6 lbs/ft$^3$ to about 15 lbs/ft$^3$, or from about 6 lbs/ft$^3$ to about 14 lbs/ft$^3$.

An indicator of degree to which a diatomite product retains the porous and intricate structure unique to diatomite may be obtained by measuring its centrifuged wet density or settled wet density, or an equivalent measure of its packed density, since the magnitude of the density is limited by the packing arrangement that can be achieved. Wet density magnitude may be critical because it may reflect the void volume available to entrain particulate matter in a filtration process, and it may be one of the most important criteria to determine the filtration efficiency. Diatomite products with lower wet densities have greater void volumes, and thus, generally greater filtration efficiency.

Convenient measurements of packed densities of diatomite powders are generally more reproducible in liquid media than in gases. One preferred method for determining the packed density of some embodiments of the diatomaceous products is by measurement of the centrifuged wet density. If the sample to be tested is a non-calcined product, the sample should be dried to constant weight at 110° C. in air, and subsequently allowed to cool to room temperature in air (i.e., dried). If the sample to be tested is a calcined or flux-calcined product, the sample should be dried to constant weight at room temperature in air. A sample of known weight between 0.50 grams and 2.00 grams is placed in a calibrated centrifuge tube, to which deionized water is added to fill up about half the volume of the tube. The mixture is shaken thoroughly until all of the sample is wetted, and there is no dry powder remaining. Additional deionized water is added to, for example, just below the 15 mL level of the centrifuge tube to rinse down any mixture adhering to the side of the tube from shaking. Thereafter, the tube is centrifuged (e.g., via a Beckman AccuSpin) for three minutes or more at 2,500 rpm or more. Following centrifugation, the tube is carefully removed so as not to disturb the solids, and the level (i.e., volume) of the settled matter is measured to the nearest half of a 0.1 mL graduation on the tube. The centrifuged wet density of the known weight of powder is readily calculated by dividing the sample weight by the measured volume, for example, using the following formula:

$$\text{Wet density (g/cm}^3\text{)}=((100-A)\times\text{wt})/(B\times100)=\text{Wet density (lbs/ft}^3\text{)}/62.4,$$

where A equals percent moisture; wt equals weight in grams; and B equals tube volume reading.

Typically, centrifuged wet density is reported in units of pounds per cubic foot (lbs/ft$^3$) or in units of grams per cubic centimeter (g/cm$^3$); the conversion factor for these units is 1 lb/ft$^3$ is equal to about 0.01602 g/cm$^3$.

According to still another aspect, a diatomaceous earth product may include a diatomaceous earth having a loose weight density of less than about 14 lbs/ft3, and a silica specific volume of at least about 3.2. For example, the diatomaceous earth product may have a silica specific volume of at least about 3.5, at least about 3.7, or at least about 4. According to another aspect, the loose weight density may range from about 6 lbs/ft3 to about 10 lbs/ft3, or from about 11 lbs/ft3 to about 14 lbs/ft3.

According to some embodiments, the feed material may include diatomaceous earth having a silica specific volume of at least about 3.5 or, for example, at least about 3.7. According to some embodiments, the feed material may include diatomaceous earth having a total silica content or more than about 95% (w/w) SiO$_2$ on an ignited basis (e.g., in the range of about 95% to about 99.9% (w/w) SiO$_2$). According to some embodiments, the feed material may have a centrifuged wet density of less than about 0.28 g/cm$^3$ (e.g., in the range of about 0.15 g/cm$^3$ to about 0.28 g/cm$^3$). According to some embodiments, the feed material may retain the intricate and porous structure unique to diatomite, and may have a permeability that is typically less than 0.1 Darcy (e.g., in the range of about 0.001 Darcy to about 0.1 Darcy). According to some embodiments, the feed material may have a total iron content of less than 0.3% (w/w) Fe$_2$O$_3$ on an ignited basis (e.g., in the range of about 0.005% to about 0.3% (w/w) Fe$_2$O$_3$), and a total aluminum content of less than 0.5% (w/w) Al$_2$O$_3$ on an ignited basis (e.g., in the range of about 0.01% to about 0.5% (w/w) Al$_2$O$_3$). With respect to solubility, according to some embodiments, the feed material may have a specific resistance greater than 50 kQ-cm (e.g., in the range of about 50 kQ-cm to about 250 kQ-cm), a beer-soluble iron content less than 7 mg Fe/kg feed (e.g., in the range of from about the quantitation limit to about 7 mg Fe/kg feed), and a beer-soluble aluminum content less than 10 mg Al/kg feed (e.g., in the range of from about the quantitation limit to about 10 mg Al/kg feed).

The method may further include adding alkali flux to the feed material to achieve a combination having a stoichiometric ratio of alkali metal to iron and/or aluminum ranging from about 100% to about 400%. The method may also include calcining the combination at a temperature ranging from about 1,600° F. to about 2,200° F., wherein following calcination, the diatomaceous earth product has a loose weight density of less than about 14 lbs/ft3. For example, the temperature may range from about 1,600° F. to about 2,150° F., or from about 1,600° F. to about 2,050° F.

According to some embodiments, the calcining may occur for a duration ranging from about 15 minutes to about 60 minutes. For example, the calcining may occur for a duration ranging from about 35 minutes to about 45 minutes.

According to some embodiments, the alkali flux may be selected from the group consisting of sodium, potassium, and any other alkali or alkaline earth metals. For example, the alkali flux may include soda ash (sodium carbonate).

According to some embodiments of the methods, the resulting loose weight density may range from about 6 lbs/ft$^3$ to about 10 lbs/ft$^3$. According to some embodiments, the resulting loose weight density may range from about 11 lbs/ft$^3$ to about 14 lbs/ft$^3$.

According to some embodiments of the methods, the method may result in the stoichiometric ratio of alkali metal to iron and/or aluminum may range from about 125% to about 350%. For example, the stoichiometric ratio of alkali metal to iron and/or aluminum may range from about 150% to about 300%, from about 150% to about 250%, from about 175% to about 325%, from about 175% to about 300%, or from about 175% to about 275%.

According to some embodiments of the methods, the method may result in the diatomaceous earth product having a BET surface area ranging from about 0.5 m$^2$/g to about 20 m$^2$/g. For example, the diatomaceous earth product may have a BET surface area ranging from about 1 m$^2$/g to about 20 m$^2$/g, from about 1 m$^2$/g to about 10 m$^2$/g, from about 2 m$^2$/g to about 10 m$^2$/g, from about 1 m$^2$/g to about 5 m$^2$/g, or from about 3 m$^2$/g to about 5 m$^2$/g.

According to some embodiments of the methods, the method may result in particles of the diatomaceous earth product having a size ranging from about 20 US Mesh sieve to about 270 US Mesh sieve. For example, particles of the diatomaceous earth product may have a size ranging from about 20 US Mesh sieve to about 200 US Mesh sieve, from about 60 US Mesh sieve to about 140 US Mesh sieve, or from about 80 US Mesh sieve to about 120 US Mesh sieve.

According to some embodiments of the methods, the method may result in the diatomaceous earth product having a silica content of at least about 95% by weight. According to some embodiments, the resulting diatomaceous earth product may be one of non-calcined and non-flux-calcined, and may have a silica content of at least about 95% by weight. According to some embodiments of the methods, the resulting diatomaceous earth product may have a silica content of at least about 90% by weight. According to some embodiments of the methods, the resulting diatomaceous earth may be flux-calcined, and may have a silica content of at least about 90% by weight.

According to some embodiments of the methods, the method may result in the diatomaceous earth product having a silica specific volume of at least about 3.2. For example, the diatomaceous earth product may have a silica specific volume of at least about 3.5, at least about 3.7, or at least about 4.

According to some embodiments of the methods, the method may result in the diatomaceous earth product having a content of at least 70% by weight, within two narrowly specified US Mesh sieve sizes. According to some embodiments, the method may result in the diatomaceous earth product having a content of at least 80% by weight, within two narrowly specified US Mesh sieve sizes. According to some embodiments, the method may result in the diatomaceous earth product having a content of at least 90% by weight, within two narrowly specified US Mesh sieve sizes. For example, the method may result in the diatomaceous earth product having a content of at least 80% by weight, within 80 US Mesh (177 microns) and 100 US Mesh (149 microns) sieve sizes, or the method may result in the diatomaceous earth product having a content of at least 90% by weight, within 60 US Mesh (250 microns) and 80 US Mesh (177 microns) sieve sizes.

According to some embodiments of the methods, the method may result in the diatomaceous earth product having an iron solubility ranging from about 0.5 parts per million to about 15 parts per million.

An exemplary feed material for producing the diatomaceous earth products according to some embodiments included a crude ore of diatomaceous earth that was crushed and hammer-milled to pass through a 12 mesh screen (i.e., with openings of approximately 1.82 mm), slurried with water to a pulp density of 20 to 23% solids, and then attrition-milled to pass through a screen with openings of approximately 174 microns. The slurry was diluted to 8 to 10% solids with water, and introduced to a 1 inch (2.5 cm) hydrocyclone operated at a pressure of 50 to 60 pounds per square inch (psi) (345 to 414 kPa). The overflow fraction contained particles with a median particle size of 10 to 12 microns. A collector was prepared by dissolving equal volumes of tripentylamine (i.e., N(C$_5$H$_{11}$)$_3$) in acetic acid (i.e., CH$_3$COOH) prior to addition. In a preconditioning step, the pH of the diatomite overflow was adjusted to within a desired range of pH 3 to 5 using sulfuric acid (i.e., H$_2$SO$_4$), and sufficient tripentylamine solution was added to deliver 360 to 390 grams of tripentylamine per 1000 kg of solids. Mechanical flotation was then effected in two stages, a rougher stage and a scavenger stage. The diatomite flotation product from the second scavenger stage was recirculated in combination with hydrocyclone overflow feed to the first rougher stage flotation, with a sufficient quantity of tripentylamine solution delivered directly to the flotation cells to add a 240 to 260 gram supplement of tripentylamine per 1000 kg of solids. The overall flotation process was adjusted to provide a 60 to 65% yield of flotation product. The flotation product was then thickened to a pulp density of 10% solids using 600 grams of SuperFloc 127 Plus (Cytec, a polyacrylamide (i.e., [CH—CH(CONH$_2$)]$_n$) flocculent) per 1,000 kg of solids, then leached for two hours with 2 N sulfuric acid (i.e., H$_2$SO$_4$) maintained at a temperature of 90 to 95° C. The slurry was dewatered with a pressure filter, the cake rinsed with deionized water to obtain a minimum rinse water specific resistance of 250 kΩ-cm, and then dried to constant weight at 110° C. in air in an oven.

Upon ultimate analysis, this exemplary non-calcined feed material was found to have a total silica content of 99.1% (w/w) SiO$_2$, found on an ignited basis, as determined by x-ray fluorescence using the fused-tetraborate matrix method. The feed material further had a total aluminum content of 0.31% (w/w) reported as Al$_2$O$_3$, and a total iron content of 0.15% (w/w) reported as Fe$_2$O$_3$, as determined by x-ray fluorescence using the fused-tetraborate matrix method. Its centrifuged wet density was 0.27 g/cm$^3$. From this information, the silica specific volume SSV for this feed material was 3.7.

According to some embodiments, the purified diatomaceous earth products may have extraordinarily high silica content. In addition to a high silica content, these exemplary products may also retain the intricate and porous structure that is characteristic of diatomaceous earth (i.e., these products have an intricate and porous diatomaceous silica structure), which may be desirable in many applications for the diatomaceous earth product to be effective. This unique combination of properties may result in, for example, a desirable low centrifuged wet density, which may further result in a high silica specific volume.

According to some embodiments, the diatomaceous earth products may have a low density in conjunction with low impurity solubility, which may permit for increased capacity, flow, clarity, and/or occupancy per unit of weight in spatially-limited applications, while significantly reducing the contribution of undesirable aluminum, iron, and/or other elements from the diatomaceous earth product to a contacted material.

According to some embodiments, the purified diatomaceous earth products and their further modifications may be useful in the processing, treatment, and/or formulation of other materials. For example, in filtration applications, the diatomaceous earth products and their further modifications may be applied to a septum to improve clarity and increase flow rate in filtration processes, and/or added directly to a fluid as it is being filtered to reduce the loading of undesirable particulate at the septum. The products may be used in conjunction with other media during filtration, for example, cellulose, activated charcoal, clay, or other materials. The products may also be used in preparing composites, being intimately compounded with other ingredients to make sheets, pads, and/or cartridges. The appropriate selection of which modification of the purified diatomaceous earth products may be determined according to the specific application. For example, in a filtration process desiring exceptional clarity but tolerates slower flow rate, a purified diatomaceous earth product of the non-calcined or calcined classes may be preferred. Alternatively, in a filtration process desiring high flow rate but does not require exceptional clarity, a purified diatomaceous earth product of the flux-calcined class may be preferred. Similar reasoning applies to use of the purified diatomaceous earth products when used in conjunction with other materials, and/or when preparing composite materials containing the product. The quantity of product used may be similarly determined according to the specific process to which it is applied.

Use of the purified diatomaceous earth products according to some embodiments as functional fillers, for example, in paints and coatings, or in polymers, may be accomplished by direct addition into the formulation at a particular concentration to achieve the desired effect. Both the flatting property of the products in paints and coatings, as well as the anti-block property of the products in polymers, may be derived from the irregular surface provided by the porous, intricate structure of at least some embodiments of the diatomaceous earth products.

According to some embodiments, silanized hydrophobic or hydrophilic diatomaceous earth products may be desirable when these properties further improve the filtration or functional filler performance, owing to their greater compatibility with other materials or ingredients in a specific application. The alteration of surface characteristics through silanization may be especially desirable for chromatographic applications, as these characteristics may strongly influence the effectiveness of chromatographic separations for specific systems. For example, hydrophobic surfaces on a chromatographic support reduce surface activity of the support and reduce tailing to a considerable degree when used for the analytical determination of many organic compounds, such as pesticides.

According to some embodiments, the diatomaceous earth products may also be desirable for further organic derivatizations, such as, for example, the coupling of a protein to an aminosilanized support. For example, protein A, a polypeptide derived from a bacterial source, has been coupled to an aminosilanized diatomite-based support for use in clinical treatment of immunologic disorders.

Other embodiments of the invention will be apparent to those skilled in the art from consideration of the specification and practice of the invention disclosed herein. It is intended that the description and examples be considered as exemplary only, with a true scope and spirit of the invention being indicated by the following claims.

What is claimed is:

1. A diatomaceous earth product, the product comprising diatomaceous earth having a loose weight density of less than about 14 lbs/ft$^3$, and a stoichiometric ratio on an ignited basis for their respective high oxides of alkali metal to combined total of iron and aluminum ranging from 150% to 350%.

2. The product of claim 1, wherein the loose weight density ranges from about 6 lbs/ft$^3$ to about 10 lbs/ft$^3$.

3. The product of claim 1, wherein the loose weight density ranges from about 11 lbs/ft$^3$ to about 14 lbs/ft$^3$.

4. The product of claim 1, wherein the stoichiometric ratio on an ignited basis for their respective high oxides of alkali metal to combined total of iron and aluminum ranges from 175% to 325%.

5. The product of claim 1, wherein the diatomaceous earth product has a BET surface area ranging from about 0.5 m$^2$/g to about 20 m$^2$/g.

6. The product of claim 1, wherein the diatomaceous earth product has a BET surface area ranging from about 1 m$^2$/g to about 5 m$^2$/g.

7. The product of claim 1, wherein particles of the diatomaceous earth product have a size ranging from about 20 US Mesh sieve to about 200 US Mesh sieve.

8. The product of claim 1, wherein the diatomaceous earth product is one of non-calcined and non-flux-calcined.

9. The product of claim 1, wherein the diatomaceous earth product has a silica content of at least about 90% by weight.

10. The product of claim 1, wherein the diatomaceous earth product has a silica specific volume of at least about 3.2.

11. The product of claim 1, wherein the diatomaceous earth product has a silica specific volume of at least about 3.5.

12. The product of claim 1, wherein the diatomaceous earth product has a silica specific volume of at least about 4.

13. The product of claim 1, wherein the diatomaceous earth product has a content of at least 70% by weight, within 120 US Mesh (125 microns) and 140 US Mesh (105 microns) sieve sizes.

14. The product of claim 1, wherein the diatomaceous earth product has an iron solubility ranging from about 0.5 parts per million to about 15 parts per million.

15. The product of claim 1, wherein the diatomaceous earth product has a wet density less than about 16 lbs/ft$^3$.

16. The product of claim 1, wherein the diatomaceous earth product has an intricate and porous diatomaceous silica structure.

17. The product of claim 1, wherein the stoichiometric ratio on an ignited basis for their respective high oxides of alkali metal to combined total of iron and aluminum ranging from 150% to 300%.

* * * * *